United States Patent [19]
Eilers

[11] 3,754,208
[45] Aug. 21, 1973

[54] COMPOUND LENS FOR CONVERTING THE EFFECT OF LARGE-AREA SONIC TRANSDUCER TO ONE OF SMALL AREA

[75] Inventor: George J. Eilers, Redwood City, Calif.

[73] Assignee: Stanford Research Institute, Menlo Park, Calif.

[22] Filed: Feb. 3, 1972

[21] Appl. No.: 223,108

[52] U.S. Cl. .............................. 340/8 L, 181/.5 R
[51] Int. Cl. .............................................. G01f 3/16
[58] Field of Search ................... 181/.5 R; 340/5 H, 340/5 MP, 8 L; 350/45

[56] References Cited
UNITED STATES PATENTS
3,295,629   1/1967   Papadakis ........................... 340/8 L
2,972,068   2/1961   Howry ................................ 340/8 L OTHER PUBLICATIONS
Journal of the Acoustical Society of America, Refracting Sound Waves, Kock and Harvey, pgs. 471–481, Sept. 1949.

Primary Examiner—Benjamin A. Borchelt
Assistant Examiner—J. V. Doramus
Attorney—Samuel Lindenberg et al.

[57] ABSTRACT

A compound lens structure for converting the response of a transducer of large lateral extent to one of significantly smaller dimensions employs a converting lens having a conical front surface in contact with the rear surface of an auxiliary hemispherical lens to allow spherical sonic waves emanating from or converging toward the point of contact to enter or leave the converting lens only through the area of contact. The rear surface of the converting lens is chosen to be a hyperbola of revolution in order that diverging waves entering through the area of contact be refracted into plane waves transmitted to the transducer. Space between the two lens is sealed and filled with a gas to enhance the masking effect of the conical surface by total reflection of waves entering that sealed space from the auxiliary lens.

5 Claims, 2 Drawing Figures

PATENTED AUG 21 1973 3,754,208

COMPOUND LENS FOR CONVERTING THE EFFECT OF LARGE-AREA SONIC TRANSDUCER TO ONE OF SMALL AREA

BACKGROUND OF THE INVENTION

This invention relates to a compound lens for converting a large-area plane-wave sonic transducer to a small-area sonic wave source while transmitting, and to a selective receiver sensitive only to components of incoming waves that approximate spherical waves converging on a small area.

To measure accurately the phase and amplitude of a sonic field, such as in ultrasonic imaging using sonic holographic techniques and in measuring the near field pattern of sonic transducers, and the like, a transducer is needed that responds only to the sonic energy converging on a small area. For example, in sonic holography, it is desirable to resolve variations that occur over less than a wavelength distance in the source field.

Efforts to satisfy this need may take many different approaches. For example, a relatively large planar transducer, such as a piezoelectric crystal may be placed directly behind a pinhole in a sheet of absorbing material. Such an arrangement will provide a transducer sensitive only to sonic disturbances in the fluid immediately adjacent to the pinhole because the amplitude of the sonic waves that reach the transducer is directly proportional to the amplitude of pressure fluctuations immediately in front of the pinhole. However, this is a very inefficient method to achieve the desired result because most of the sonic energy is either reflected or absorbed by the material surrounding the pinhole since the pinhole must be made very small, typically less than a wavelength in diameter, to obtain good resolution of the sonic field.

Another method is to make the transducer very small in diameter, as described by K. Preston, Jr. and J. L. Kreuzer in an article titled "Ultrasonic Imaging Using a Synthetic Holographic Technique" at pages 150 to 152, Applied Physics Letters, 10:5, Mar. 1, 1967. This method is also inefficient because the electrical impedance of a piezoelectric transducer is inversely proportional to its area, and for high sonic frequencies, the area of a transducer whose diameter is of the order of a wavelength of sound is so small that the resulting electrical impedance is too high to be matched by practical amplifier circuits.

A third method employs a lens to convert waves emanating from the point of interest into plane waves of lateral extent roughly equal to the diameter of a transducer having a relatively large area for sensing pressure variations. Theoretical considerations, however, limit the shape and size of the region so sensed. It is accurate to say that smaller sensed regions require a lens of larger numerical aperture. Sonic lens cannot be made to have arbitrarily large numerical apertures because they require sound waves to travel through fluid-solid boundaries at angles that eventually exceed the critical angle. Beyond this angle the sound waves are totally reflected, rendering the lens surface useless.

SUMMARY OF THE INVENTION

In accordance with the present invention, a sonic compound lens is used to either generate waves in a liquid that approximate spherical diverging waves produced from sonic energy emanating from a relatively large area transducer, or receive that component of a wave that approximates spherical converging waves on a small area using the large area transducer. The compound lens is comprised of: a converting lens having a conical front surface and a rear surface chosen to be a hyperbola of revolution, where the hyperbola is within the conical surface and the axis of revolution is the axis of the conical surface, and where the hyperbola opens out in a direction away from the apex of the conical surface; an auxiliary lens having a rear surface in contact with the apex of the conical front surface of the converting lens over a small area; and a sleeve surrounding air space between the rear surface of the auxiliary lens and the front conical surface of the converting lens. The small area of contact is preferably defined by a cylindrical tip integral with the converting lens, and the auxiliary lens is preferably spherical.

The novel features that are considered characteristic of this invention are set forth with particularity in the appended claims. The invention will best be understood from the following description when read in connection with the accompanying drawings.

DESCRIPTION OF THE PREFERRED EMBODIMENT

Figure 1:
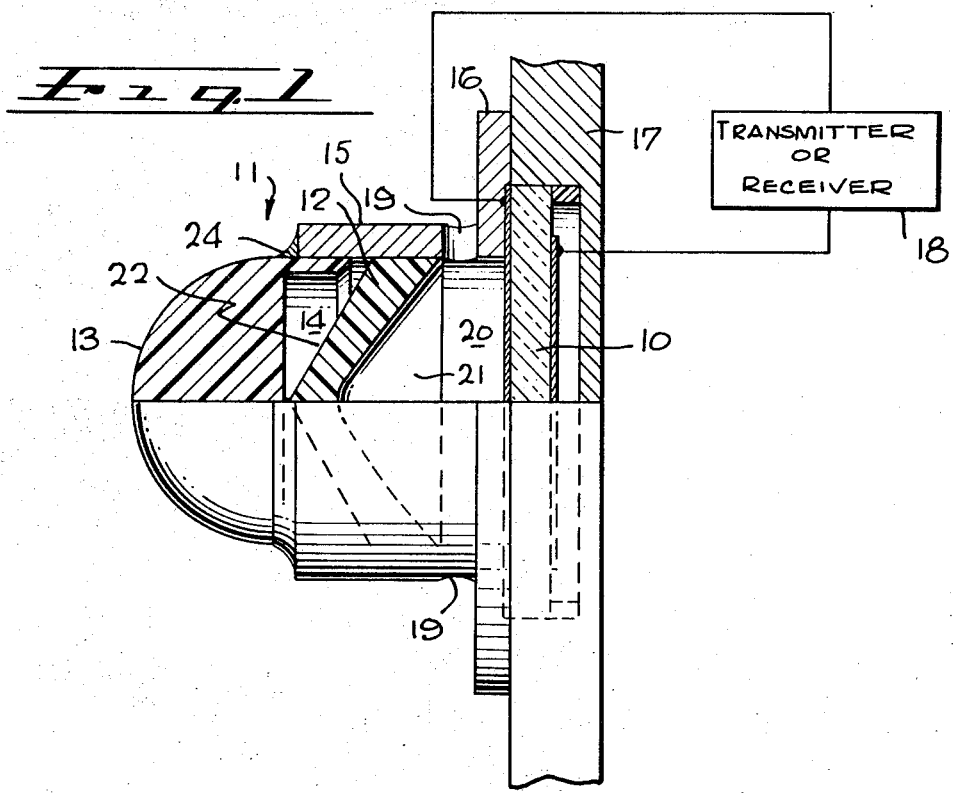
FIG. 1 illustrates the concept of the invention in a preferred embodiment.

Electromechanical transducers and converters of the type to which the present invention relates satisfy a reciprocity relationship in that the arrangement will perform as a transmitter in a manner identical but opposite to that of a receiver. The size of the region sensed when the invention shown in FIG. 1 is used as a receiver will be exactly the same as the effective source region when it is used as a transmitter, but the direction of the sonic waves is opposite. Because operation of the invention is much easier to visualize as a transmitter, the arrangement of a piezoelectric transducer 10 and a compound lens 11 according to the invention will first be described in the transmitting mode of operation.

The compound lens is comprised of two lens 12 and 13 in series and a sealed air chamber 14 formed by the two lens and a hort hollow cylindrical section 15 supported by a flange 16 attached to a supporting member of plate 17.

The transducer 10 is a conventional piezoelectric disc between metallic electrodes connected to a unit 18 for transmitting or receiving. Passages 19 permit space 20 between the lens 12 and the transducer 10 to be filed with the fluid through which sonic waves are transmitted. A diaphragm of suitable material is employed at the interface between the space 20 and the piezoelectric transducer 10 in order to couple the piezoelectric transducer to the space 20 in a conventional manner commonly employed in small microphones, for example.

The exact configuration of the transducer 10 is not important to the present invention which relates to the compound lens for converting the large-area plane-wave transducer 10 to an efficient small-area sonic wave source that is virtually a point source while transmitting, and for converting the same transducer into a selective receiver sensitive only to the components of incoming sonic waves that approximate spherical waves converging on a small area for such applications as ultrasonic imaging using holographic techniques.

If a modulated electronic field is applied to the transducer 10 from the unit 18, the transducer will radiate waves into the space 20 which are essentially plane waves. The object of the compound lens is to convert these waves into spherical waves seemingly emanating from a small area that could be referred to as a point source. Similarly, to receive sonic waves, the compound lens converts energy present in a small area of an incoming wave into essentially plane waves at the transducer.

Continuing with a description of the transmitter mode, when the plane waves from the transducer strike the rear hyperbolic surface 21 of lens 12, they are refracted, forming converging spherical waves within that lens. The front surface 22 of the converting lens 12 is chosen to be a cone. The apex of the conical surface 22 contacts the rear face of the lens 13. The point or area of contact between the lens 12 and the lens 13 is thus arranged to lie at the center of the converging wavefronts, and so to transmit a large fraction of the energy carried by them into the lens 13. The air in the space 14 separating the two lens 12 and 13 everywhere but at the point of contact represents a very low mechanical impedance, thereby preventing any sonic energy from penetrating that space. In that manner, spherical waves converging on the apex of th conical surface 22 of the lens 12 are caused to be transmitted into th lens 13 through the very small area of contact between the conical surface 22 of the lens 12 and the rear surface of the lens 13.

The source energy transmitted into the lens 13 is in the form of diverging waves emanating from a very small vertical point source. These waves are so very nearly spherical that they may be referred to as diverging spherical waves. These diverging spherical waves pass from the lens 13 into surrounding liquid via a hemispherical front surface having as its center the center of the very small area through which waves are transmitted into the lens 13.

The front surface of the auxiliary lens 13 is preferably hemispherical and centered on the small area of contact with the converting lens 12 so that spherical waves emanating from the area of contact will proceed through the hemispherical interface with surrounding liquid without being altered by refraction. This has the further advantage that since the wave fronts are nearly tangential to the lens-liquid interface, little or no mode conversion occurs. Ordinarily, when acoustic dilational waves strike an interface such as the one between the lens and the surrounding liquid, rotational waves (sometimes called sheer waves) are generated in the lens. These are generally undesirable and result in wasted energy. However, it should be understood that the front surface of the auxiliary lens could be a different shape from hemispherical and still serve its function almost as well.

The rear surface of the auxiliary lens in contact with the conical surface of the converting lens 22 is shown to be planar. However, that is arbitrary since the actual shape of the rear surface has no influence on the operation of the auxiliary lens in transmitting sonic waves that approximate spherically diverging waves or in recovering from the surrounding liquid that component of a wave that approximates spherical converging waves. The only really important feature of that rear surface is that it make contact with the apex of the conical surface 22. However, the larger the solid angle subtended by the auxiliary lens, the more nearly perfect the resulting diverging spherical waves will be. Accordingly, a slightly better design for the rear surface of the auxiliary lens 13 would be a concave conical shape reducing the air space 14. The air space could be reduced to even a few microns between the two lenses and still effectively inhibit any transmission of sonic energy, except through the area of contact between the two lens, at frequencies of about 5 MHz.

The cone angle of the front surface 22 on the converting lens 12 is also chosen arbitrarily. Its choice has little if any effect upon operation so long as it does not cut through a region of the lens transmitting significant intensity of waves. That region is approximately that included by a surface of revolution defined by the asymptotes to the hyperbola. The asymptotes would, of course, pass through approximately the center of the area of contact between the two lenses and approach the rear surface 21 near its rim. A line drawn anywhere normal to the surface of revolution defined by asymptotes to the hyperbola will form a specific angle with the axis of revolution, i.e., the axis of the compound lens. This angle is the critical angle $\theta_c$ for transmission of sound through the liquid-solid interface presented by the hyperbolic surface. The critical angle is given by the relation:

$$\sin \theta_c = V_L \div V_S$$

where $V_L$ is the source velocity of the surrounding liquid and $V_S$ is the sonic velocity of the lens material.

Each of the lens 12 and 13 may be made out of any material possessing a suitable sonic velocity $V_S$ relative to the sonic velocity $V_L$ of the surrounding fluid. Polystyrene having low loss, and an impedance near that of water, is an excellent material for use of the compound lens in water. Tests of such a compound lens have indicated nearly spherical waves over about a 120° solid cone in front of the lens (to the left as shown in FIG. 1) with an efficiency of about 10 percent.

In the receiving mode, the compound lens acts as a selective receiver, sensitive only to components of incoming waves that approximate spherical waves converging on the area of contact between the lens 12 and the lens 13. It is analogous to a large diameter plane wave receiver being sensitive only to plane waves directed at it along the normal to its surface. This is difficult to understand. For that reason the operation of the compound lens was first described in the transmitting mode. Operation in the receiving mode can then be best understood as the reverse of the transmitting mode.

Sonic waves of very broad fronts are received by the hemispherical lens 13 with approximately spherical components converging on the center of the hemispherical lens. These components are transmitted through the lens 13 and into the lens 12 where they are converted into diverging spherical waves. The area of contact between the two lens selects the region from which waves are allowed to enter the lens 12. The confined air or gas in the space 14 around the conical surface 22 allows that surface to reflect any sonic waves which reach it through the space 14, thus forming a sonic mask around the lens 12 except over the area of contact with the lens 13.

Figure 2:
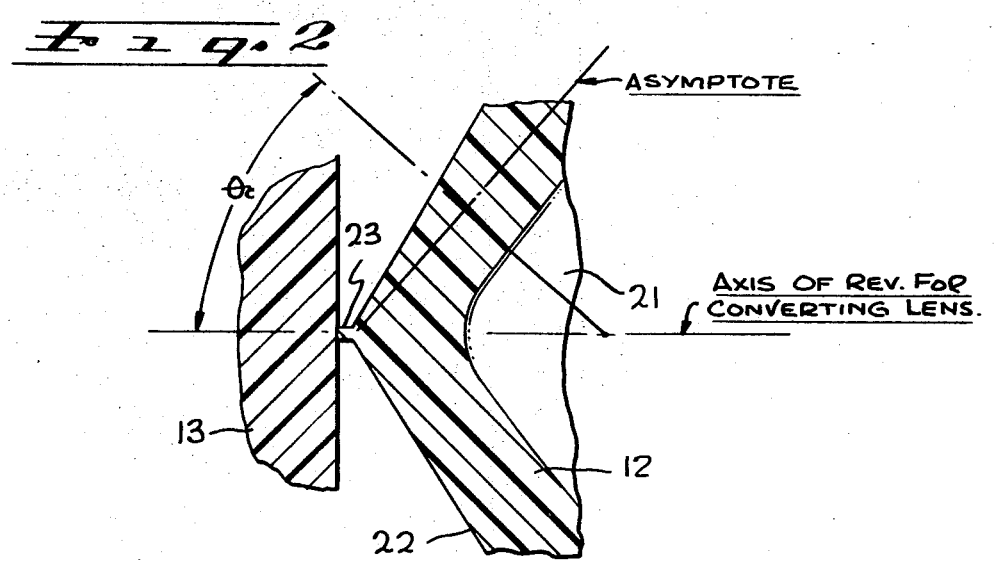
FIG. 2 illustrates in an enlarged fragmentary view a detail of the preferred embodiment. Since this embodiment is symmetrical about a horizontal axis, only the upper half of FIG. 1 is shown in section while the lower half is shown in perspective.

FIG. 2 shows in an enlarged sectional view how the area of contact may be established between the converting lens 12 and the auxiliary lens 13. A cylindrical tip 23 is formed as an intergral part of the converting lens at the apex of the conical surface 22. A flat end of the tip 23 is then placed in contact with the planar rear surface of the lens 13. A drop of epoxy between the tip 23 and the lens 13 assures a continuous solid path for sonic energy between the lens 13 and the lens 12.

Epoxy between the lens 12 and the cylindrical section 15 serves to seal the gas in the space 14 and to hold the lens 12 in place relative to the lens 13. The latter lens is held in place by epoxy fill 23 which also helps to seal the space 14.

In a typical application, the compound lens may be only one inch in diameter for a small piezoelectric transducer 10 having an effective aperture (diaphragm) area of about one inch in lateral extent to receive plane waves emanating from the converting lens 12. With the lateral extent of the transducer roughly equal to the diameter of the lens 12, there will be maximum efficiency in coupling energy from the complex lens assembly into the transducer, but that is not critical.

Although a particular embodiment of the invention has been described and illustrated herein, it is recognized that modifications and variations may readily occur to those skilled in the art. Consequently, it is intended that the claims be interpreted to cover such modifications and variations.

What is claimed is:

1. A compound lens structure, for converting the effect of a large-area sonic transducer in a liquid to one of significantly smaller area, comprised of a converting lens having a rear surface facing said transducer, said rear surface being in the form of a hyperbola of revolution, where the axis of revolution passes through the focus of the hyperbola, and a front surface in the form of a cone over said rear surface with its axis along said axis of revolution, whereby sonic waves emerging from said lens through a region of said front surface at the apex of said cone are in the form of diverging spherical waves as though said region were a sonic wave point source while substantially plane waves are transmitted by said transducer into said rear surface, an auxiliary lens having a rear surface acoustically coupled to said conical front surface of said converting lens over a small area at the apex thereof with material having a plane wave velocity substantially the same as the material of said converting lens, thereby defining said region through which sonic waves emerge from said converting lens and enter said auxiliary lens, and means for sealing a space devoid of liquid or solid material between said rear surface of said auxiliary lens and said front surface of said converting lens.

2. A compound lens structure as defined in claim 1 wherein said auxiliary lens has a hemispherical front surface with its center at the center of said rear surface area acoustically coupled to said converting lens.

3. A compound lens structure as defined in claim 2 wherein said rear surface of said auxiliary lens is acoustically coupled to said conical surface of said converting lens by a cylindrical tip formed as an integral part of said converting lens.

4. A compound lens structure as defined in claim 3 wherein the cone angle of said conical front surface is arbitrarily chosen from a range between a maximum approaching 180° and a minimum cone angle which would produce a conical surface cutting through a region between said rear surface and asymptotes to the hyperbola of revolution forming said rear surface.

5. A compound lens structure as defined in claim 4 wherein a line drawn normal to one of said asymptotes in a plane passing through said asymptote and axis of revolution for said rear surface of said converting lens defines an angle with said axis which is a critical angle $\theta_c$ for transmission of sound through said rear surface of said converting lens, where said angle $\theta_c$ bears the relation $\sin \theta_c = V_L \div V_S$ to the plane wave velocity $V_L$ in said liquid and the plane wave velocity $V_S$ in the material of said converting lens.

* * * * *